United States Patent
Miller et al.

(10) Patent No.: US 10,288,083 B2
(45) Date of Patent: May 14, 2019

(54) PITCH RANGE FOR A VARIABLE PITCH FAN

(71) Applicant: General Electric Company, Schenectady, NY (US)

(72) Inventors: Brandon Wayne Miller, Liberty Township, OH (US); Andrew Breeze-Stringfellow, Montgomery, OH (US); Darek Tomasz Zatorski, Fort Wright, KY (US); Syed Arif Khalid, West Chester, OH (US); Christopher James Kroger, West Chester, OH (US); Daniel Alan Niergarth, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 673 days.

(21) Appl. No.: 14/941,799

(22) Filed: Nov. 16, 2015

(65) Prior Publication Data

US 2017/0138370 A1    May 18, 2017

(51) Int. Cl.
*F04D 29/36*    (2006.01)
*F04D 27/00*    (2006.01)
(Continued)

(52) U.S. Cl.
CPC .............. *F04D 29/36* (2013.01); *B64C 11/30* (2013.01); *F01D 7/00* (2013.01); *F04D 27/002* (2013.01); *F04D 29/323* (2013.01); *F04D 29/325* (2013.01); *F04D 29/522* (2013.01); *F05D 2220/36* (2013.01); *F05D 2260/79* (2013.01)

(58) Field of Classification Search
CPC .... F04D 27/002; F04D 29/323; F04D 29/325; F04D 29/36; F04D 29/362; F04D 29/364; F04D 29/366; F04D 29/368; F04D 29/522; F01D 7/00; F01D 7/02; F05D 2260/74; F05D 2260/79; F05D 2220/36; B64C 11/30
See application file for complete search history.

(56) References Cited

U.S. PATENT DOCUMENTS 3,489,338 A    1/1970   Chilman et al.
3,860,361 A    1/1975   McMurtry et al.
(Continued)

OTHER PUBLICATIONS

Extended European Search Report and Opinion issued in connection with corresponding EP Application No. 16198476.0 dated Apr. 18, 2017.

*Primary Examiner* — Jason Shanske
*Assistant Examiner* — Julian Getachew
(74) *Attorney, Agent, or Firm* — General Electric Company; Pamela Kachur

(57) ABSTRACT

A variable pitch fan for a propulsion device is provided. The variable pitch fan includes a plurality of fan blades coupled to a disk and a rotatable front hub covering the disk. Each fan blade is rotatable about a pitch axis to vary a pitch of the fan blade. The pitch is variable within a pitch range that is at least about 80° to about 130°. Each fan blade extends radially outward from the disk along a span from a root to a tip. A portion of the span adjacent the root defines a root span region, a portion of the span adjacent the tip defines a tip span region. A solidity of the variable pitch fan is at least 1.0 in the root span region.

19 Claims, 6 Drawing Sheets

(51) Int. Cl.
   *F04D 29/32*    (2006.01)
   *F04D 29/52*    (2006.01)
   *F01D 7/00*     (2006.01)
   *B64C 11/30*    (2006.01)

(56) References Cited

U.S. PATENT DOCUMENTS

| | | | |
|---|---|---|---|
| 3,876,334 A | | 4/1975 | Andrews |
| 4,124,330 A | * | 11/1978 | Barnes .................... B64C 11/30 |
| | | | 416/157 B |
| 5,490,764 A | * | 2/1996 | Schilling ................... F01D 5/16 |
| | | | 416/239 |
| 5,749,700 A | * | 5/1998 | Henry ................... F01D 25/168 |
| | | | 310/90.5 |
| 7,374,403 B2 | * | 5/2008 | Decker ................... F01D 5/141 |
| | | | 416/223 A |
| 7,901,185 B2 | | 3/2011 | Suciu et al. |
| 2014/0363276 A1 | | 12/2014 | Vetters et al. |
| 2015/0167482 A1 | | 6/2015 | Gallet |

\* cited by examiner

PITCH RANGE FOR A VARIABLE PITCH FAN

FIELD OF THE INVENTION

The present subject matter relates generally to a fan for a propulsion device, or more particularly to a variable pitch fan for a propulsion device such as a gas turbine engine.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, airflow is provided from the fan to an inlet of the compressor section where one or more compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the compressor section and is then routed through the exhaust section, e.g., to atmosphere. In particular configurations, the turbine section is mechanically coupled to the compressor section by a shaft extending along an axial direction of the gas turbine engine.

The fan includes a plurality of blades having a radius larger than the core of the gas turbine engine. The fan and plurality of blades may also be mechanically coupled to the shaft such that they rotate along with the turbine. In certain configurations, the fan may be mechanically coupled to the shaft through a gear box, such that the fan can have a different rotational speed than the turbine shaft. A rotatable hub can be provided, covering at least a portion of the fan and rotating along with the fan. Rotation of the plurality of blades generates thrust for the gas turbine engine and provides airflow to the compressor section of the core. Additionally, a plurality outlet guide vanes can direct airflow from the blades to, e.g., reduce noise generated by the gas turbine engine and enhance performance of the gas turbine engine. Similar fans also may be provided for other propulsion devices.

For at least some propulsion devices, the fan is a variable pitch fan. It is desirable to vary the pitch of the fan blades by rotating each blade about respective pitch axes to further increase performance of the propulsion device. For example, a primary reason for changing blade pitch is to adjust the blade's angle of attack for optimal performance based on the present air speed of the aircraft and power level of the engine. In addition, the pitch of fan blades may be used to reverse the airflow through the fan, thus providing reverse thrust to aerodynamically brake a landing aircraft.

Generally, the pitch of the fan blades varies between a number of pitch positions such that the fan blades traverse a range of pitches. A certain pitch range may be required to accommodate the various pitch positions associated with different phases of flight and/or optimal performance of the gas turbine engine. However, the pitch range often is restricted by design parameters or considerations such as a solidity of the fan blades and the configuration of various components of the fan, such as counterweights, trunnion mechanisms, and pitch change actuator assemblies.

Accordingly, a variable pitch fan for a propulsion device having features to enable a larger pitch range with optimal design parameters would be desirable. In particular, a variable pitch fan having a plurality of fan blades where a pitch of the fan blades may be varied over an increased pitch range and having an increased solidity in a root region of the fan blades would be beneficial. A variable pitch fan having a plurality of fan blades where a pitch of the fan blades may be varied over an increased pitch range and having a decreased fan hub radius ratio and/or a decreased fan pressure ratio also would be advantageous.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a variable pitch fan for a propulsion device is provided. The variable pitch fan includes a plurality of fan blades coupled to a disk. Each fan blade of the plurality of fan blades extends radially outward from the disk, and each fan blade extends along a span from a root to a tip. A portion of the span adjacent the root defines a root span region, and a portion of the span adjacent the tip defines a tip span region. Further, each fan blade is rotatable about a pitch axis to vary a pitch of the fan blade, and the pitch axis extends radially through the fan blade. The pitch is variable within a pitch range that is at least about 80° to about 130°. Moreover, a solidity of the variable pitch fan is at least 1.0 in the root span region.

In another exemplary embodiment of the present disclosure, a variable pitch fan for a propulsion device is provided. The variable pitch fan includes a plurality of fan blades coupled to a disk and a rotatable front hub covering the disk. Each fan blade of the plurality of fan blades extends radially outward from the disk, and each fan blade extends along a span from a root to a tip. A portion of the span adjacent the root defines a root span region, and a portion of the span adjacent the tip defines a tip span region. A solidity of the variable pitch fan is at least 1.0 in the root span region, a fan pressure ratio of the variable pitch fan is less than about 1.5, and a fan hub radius ratio of the variable pitch fan is less than about 0.40. Further, each fan blade is rotatable about a pitch axis to vary a pitch of the fan blade, and the pitch axis extending radially through the fan blade. The pitch is variable within a pitch range, and the pitch range is at least about 80° to about 130°.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
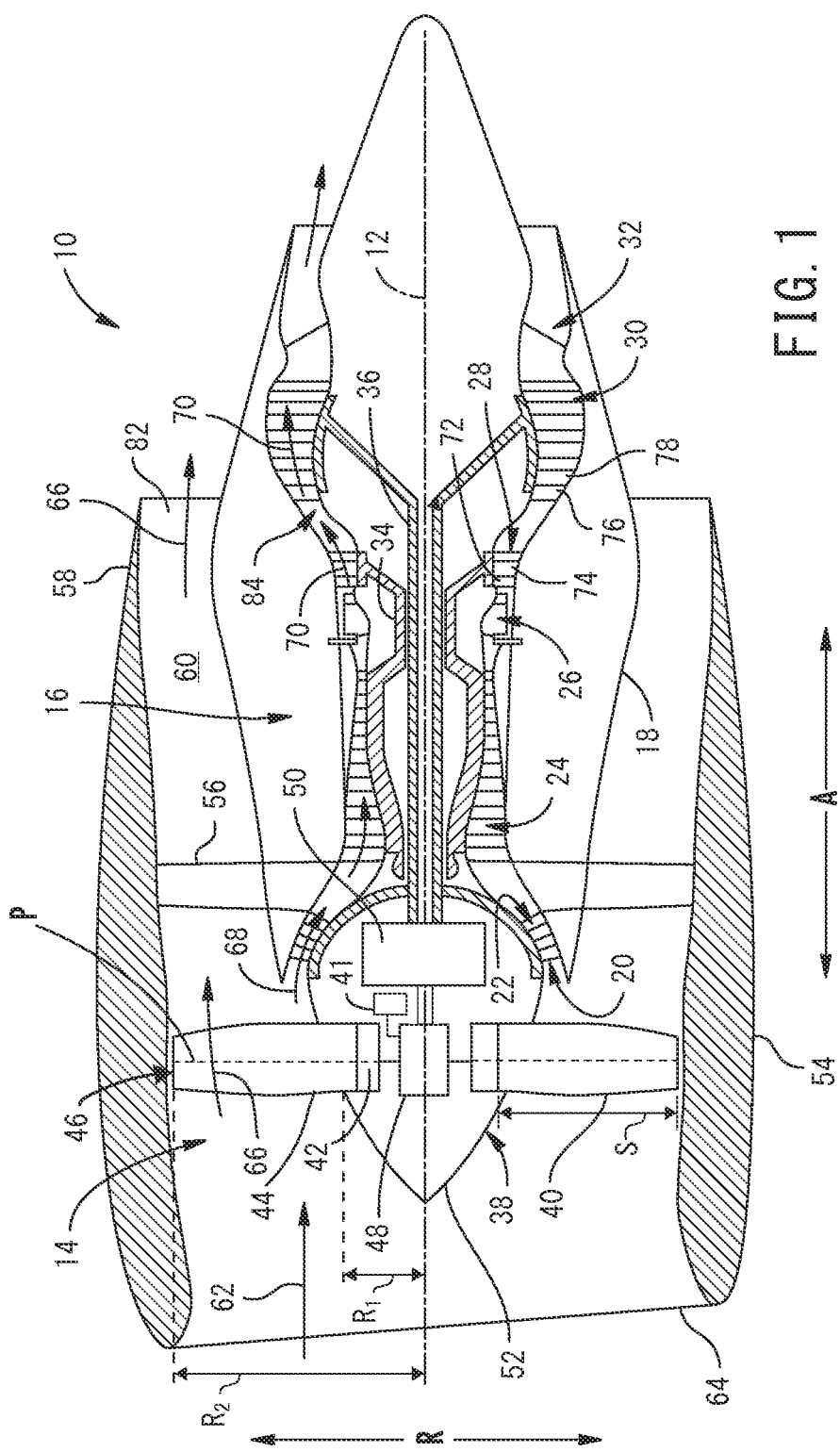
FIG. 1 is a schematic cross-sectional view of a gas turbine engine according to an exemplary embodiment of the present subject matter.

Repeat use of reference characters in the present specification and drawings is intended to represent the same or analogous features or elements of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. In addition, it should be appreciated that the term "fluid" as used herein includes any material or medium that flows, including, but not limited to, gas and air.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the plurality of fan blades 40 defines a leading edge 44, or upstream edge, and a tip 46. Tip 46 is defined at a radially outer edge of each respective fan blade 40. As discussed below, fan blades 40 are operatively coupled to a suitable pitch change actuation assembly 48 configured to vary the pitch of fan blades 40 by rotating each fan blade 40 relative to disk 42 about a pitch axis P. Fan blades 40, disk 42, and actuation assembly 48 are together rotatable about the longitudinal axis 12 by LP shaft 36 across a power gear box 50. The power gear box 50 includes a plurality of gears for stepping down the rotational speed of the LP shaft 36 to a more efficient rotational fan speed.

Moreover, fan blades 40 are operatively coupled to a pitch correction device 41 (e.g., a counterweight device or a suitable pitch lock device) across actuation assembly 48 such that pitch correction device 41 is said to be remote from (i.e., not coupled directly to) fan blades 40. Pitch correction device 41 is suitably configured to drive the pitch of fan blades 40 to a predetermined pitch angle in the event that actuation assembly 48 is no longer operable for controlling the pitch of fan blades 40. For example, in an exemplary embodiment, pitch correction device 41 is a counterweight device configured to pitch fan blades 40 such that fan 38 continues to absorb power generated by turbines 28, 30, rather than unloading turbines 28, 30, in the event that actuation assembly 48 is no longer operable for controlling the pitch of fan blades 40. Further, as shown, each fan blade 40 is not provided with its own dedicated pitch correction device 41 attached thereto, but instead, remote pitch correction device 41 is operatively coupled to fan blades 40 through actuation assembly 48. Thus, pitch correction device 41 is located away from fan blades 40 and disk 42 so as to not crowd the available space near disk 42 and, hence, to enable a smaller diameter of disk 42. A smaller diameter disk 42 can help reduce a fan hub radius ratio, described below, as well as allow a higher fan blade count. It should be understood that pitch correction device 41 may have any suitable configuration that facilitates providing a smaller diameter disk for a variable pitch fan, e.g., by enabling pitch correction device 41 to not be coupled directly to fan blades 40 such that the device is a remote pitch correction device for the fan blades. Further, in appropriate embodiments, pitch correction device 41 may be omitted, e.g., no counterweights and no pitch lock device may be provided.

As further depicted in FIG. 1, disk 42 of variable pitch fan 38 is covered by a rotatable front hub 52 aerodynamically contoured to promote an airflow through the plurality of fan blades 40. The performance of engine 10 can be affected by the overall size of the rotatable hub 52 along the radial direction R. As used herein, the fan hub radius ratio previously mentioned is a ratio of a radius $R_1$ over a radius $R_2$. Radius $R_1$ is a radius of the rotatable hub 52 along the radial direction R from the longitudinal centerline 12 at the leading edge 44 of the blades 40. Radius $R_2$ is a radius of the blades 40 from the blade tips 46 to the longitudinal centerline 12 also at the leading edge 44 of the blades 40. For a given $R_2$, reducing $R_1$ increases a fan frontal flow area, which reduces a fan pressure ratio for a given thrust, thereby improving fan aerodynamic efficiency. Alternatively, for a given fan frontal flow area and associated fan aerodynamic efficiency, reducing $R_1$ decreases $R_2$, thereby reducing the size and weight of the fan. Accordingly, reducing the fan hub radius ratio can improve the performance or size and weight of the engine. Further, reducing $R_1$ reduces the curvature experienced by the airflow over the rotatable hub 52 into the core 16, thereby reducing loss penalties.

Because rotatable hub 52 houses disk 42, the size of rotatable hub 52 (along the radial direction R) is in part dictated by the size of disk 42 (along the radial direction R). Further, the size of disk 42 is, in part, dictated by the amount of force the components must be capable of withstanding. Due to the rotational speed at which fan 38 rotates about the longitudinal centerline 12 during operation of turbofan engine 10, a centrifugal force on the components can be great. The centrifugal force directly correlates to a mass/weight of the components and a length of blades 40. Thus, it is desirable to reduce a weight of disk 42 to facilitate reducing the size of disk 42, the radius $R_1$ of rotatable hub 52, and fan hub radius ratio.

As will be described in greater detail below, certain embodiments of the present disclosure allow for such a reduction in fan hub radius ratio by reducing a weight of certain components of fan 38 (e.g., certain bearings, discussed below), which generate less centrifugal force and thereby permit smaller and more compact components that are not required to withstand heightened centrifugal forces. More particularly, in the depicted exemplary embodiment, the fan hub radius ratio for turbofan engine 10 has been reduced to less than or equal to about 0.40. However, in other exemplary embodiments, the fan hub radius ratio may instead be less than or equal to about 0.35, less than or equal to about 0.30, or alternatively, fan 38 may have any other suitable fan hub radius ratio. It should be appreciated that, as used herein, terms of approximation, such as "about," refer to being within a ten percent (10%) margin of error.

Referring still to the exemplary turbofan engine 10 of FIG. 1, the exemplary fan section 14 additionally includes an annular fan casing or outer nacelle 54 that circumferentially surrounds the fan 38 and/or at least a portion of the core turbine engine 16. It should be appreciated that the nacelle 54 may be configured to be supported relative to the core turbine engine 16 by a plurality of circumferentially-spaced outlet guide vanes 56. Moreover, a downstream section 58 of the nacelle 54 may extend over an outer portion of the core turbine engine 16 so as to define a bypass airflow passage 60 therebetween.

During operation of the turbofan engine 10, a volume of air 62 enters the turbofan 10 through an associated inlet 64 of the nacelle 54 and/or fan section 14. As the volume of air 62 passes across the fan blades 40, a first portion of the air as indicated by arrows 66 is directed or routed into the bypass airflow passage 60 and a second portion of the air as indicated by arrow 68 is directed or routed into the LP compressor 22. The ratio between the first portion of air 66 and the second portion of air 68 is commonly known as a bypass ratio. The pressure of the second portion of air 68 is then increased as it is routed through the high pressure (HP) compressor 24 and into the combustion section 26, where it is mixed with fuel and burned to provide combustion gases 70.

The combustion gases 70 are routed through the HP turbine 28 where a portion of thermal and/or kinetic energy from the combustion gases 70 is extracted via sequential stages of HP turbine stator vanes 72 that are coupled to the outer casing 18 and HP turbine rotor blades 74 that are coupled to the HP shaft or spool 34, thus causing the HP shaft or spool 34 to rotate, thereby supporting operation of the HP compressor 24. The combustion gases 70 are then routed through the LP turbine 30 where a second portion of thermal and kinetic energy is extracted from the combustion gases 70 via sequential stages of LP turbine stator vanes 76 that are coupled to the outer casing 18 and LP turbine rotor blades 78 that are coupled to the LP shaft or spool 36, thus causing the LP shaft or spool 36 to rotate, thereby supporting operation of the LP compressor 22 and/or rotation of the fan 38.

The combustion gases 70 are subsequently routed through a jet exhaust nozzle section 32 of the core turbine engine 16 to provide propulsive thrust. Simultaneously, the first portion of air 66 is routed through the bypass airflow passage 60 before it is exhausted from a fan nozzle exhaust section 82 of the turbofan 10 also providing propulsive thrust. The HP turbine 28, the LP turbine 30, and the jet exhaust nozzle section 32 at least partially define a hot gas path 84 for routing the combustion gases 70 through the core turbine engine 16.

The configuration of turbofan engine 10 depicted in FIG. 1, having outer nacelle 54 circumferentially surrounding variable pitch fan 38, generally may be described as a ducted configuration. Although described herein with respect to turbofan engine 10, it should be understood that the present disclosure applies equally to unducted configurations of variable pitch fans of turbofan engines. Additionally, in still other exemplary embodiments, aspects of the present disclosure may be incorporated into other propulsion devices, such as an electrically powered fan engine, ducted or unducted.

Figure 2:
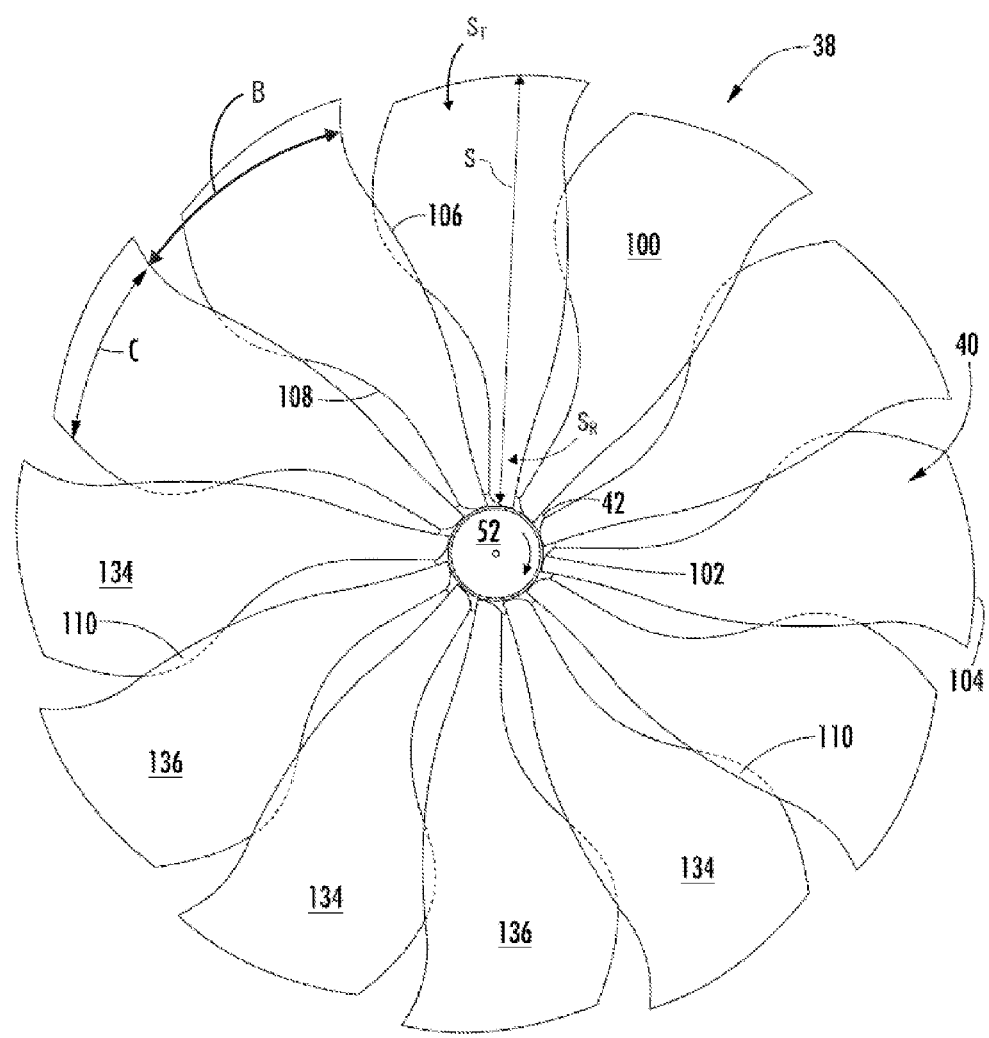
FIG. 2 is a perspective view of a variable pitch fan of the exemplary gas turbine engine of FIG. 1 according to an exemplary embodiment of the present subject matter.

Referring now to FIG. 2, fan 38 will be described in greater detail. FIG. 2 provides a forward-facing-aft elevational view of fan 38 of the exemplary turbofan engine 10 of FIG. 1. For the depicted exemplary embodiment, fan 38 includes twelve (12) fan blades 40. From a loading standpoint, such a blade count enables the span of each fan blade 40 to be reduced such that the overall diameter of fan 38 is also able to be reduced (e.g., to about twelve feet in the exemplary embodiment). That said, in other embodiments, fan 38 may have any suitable blade count and any suitable diameter. For example, in one suitable embodiment, fan 38 may have at least ten (10) fan blades 40. In another suitable embodiment, fan 38 may have at least eleven (11) fan blades 40. In yet another suitable embodiment, fan 38 may have at least twelve (12) fan blades 40. In yet other suitable embodiments, fan 38 may have at least fifteen (15) or at least eighteen (18) fan blades 40.

Preferably, fan 38 has a fan pressure ratio of about 1.5 or less. The fan pressure ratio is the ratio of the fan outlet or discharge pressure to the fan inlet pressure. A fan pressure ratio below about 1.5 allows improved mechanical and propulsive efficiency. In an exemplary embodiment, the fan pressure ratio may be about 1.4; in another suitable embodiment, the fan pressure ratio may be about 1.2. However, the fan pressure ratio also may have other values below or less than about 1.5.

Each fan blade 40 may have a suitable aerodynamic profile including a generally concave pressure side and a circumferentially opposite, generally convex suction side 100. Each fan blade 40 extends radially along a span S from an inner root 102, which is rotatably coupled to disk 42, to a radially outer distal tip 104 disposed closely adjacent to the fan casing or nacelle 54 for providing a relatively small tip clearance or gap therebetween. That is, root 102 is the radially innermost portion of fan blade 40, and tip 104 is the radially outermost portion of fan blade 40. Further, each fan blade 40 is rotatable about a pitch axis P with respect to disk 42; each pitch axis P generally extends radially through its respective fan blade 40.

Variable pitch fans, such as fan 38, traverse a range of pitch or angular positions during forward flight and reverse, e.g., fan blades 40 rotate with respect to pitch axis P to vary the pitch of fan blades over an angular range corresponding to various pitch positions. For example, fan blades 40 may have a pitch position with respect to pitch axis P during a cruise phase of forward flight and a different pitch position with respect to pitch axis P during a takeoff phase. Further, these pitch positions or pitch angles of fan blades 40 may be different than a pitch position during a reverse thrust phase.

Typically, between pitch positions for different phases of forward flight and reverse thrust, the extent of angular movement of fan blades 40 is at least about 80° and preferably about 120° or about 130°. That is, a pitch range of at least about 80°, preferably about 120° or about 130°, separates two extreme pitch positions, with other pitch positions between those two. Thus, fan blades 40 must be able to traverse a pitch range between about 80° and about 130°.

As an example, the two pitch positions separated by the pitch range are a coarse/feather pitch position and a reverse pitch position, i.e., between a pitch of fan blades 40 for a coarse/feather phase and a pitch of fan blades 40 for a reverse thrust phase. In some embodiments, the pitch range may be about 80°; that is, fan blades 40 traverse about 80° in transitioning from one extreme pitch position to the other during phases of forward flight and reverse thrust. In alternative embodiments, the pitch range may be about 120°; that is, fan blades 40 traverse about 120° in transitioning from one extreme pitch position to the other during phases of forward flight and reverse thrust. In still other suitable embodiments, the pitch range may be about 90°, about 100°, about 110°, or about 130°. Thus, in suitable embodiments of the present disclosure, the pitch of fan blades 40 is variable within a pitch range, where the pitch range is between about 80° to about 130°, but other pitch ranges (e.g., less than about 80° or more than about 130°) may be used as well.

Although a pitch range of at least about 80°, and preferably about 120° or 130°, generally is required to accommodate the various pitch angles of fan blades 40 of variable pitch fan 38, other design features or considerations may interfere with or restrict the pitch range of blades 40. For example, a desired solidity of fan 38, further described below, may dictate a lower or smaller pitch range. That is, to achieve a desired solidity value, variations in the pitch of fan blades 40 may be limited such that the pitch range is less than about 80°. As other examples, the configuration of counterweights, trunnion mechanisms, and/or pitch change actuator assemblies, as well as other components of fan section 14, may restrict the range of pitch or angular positions fan blades 40 are able to traverse. Accordingly, fan 38 may utilize one or more features described herein, such as e.g., actuator assembly 48 and/or trunnion mechanism 150, to achieve a pitch range of at least about 80°, preferably about 120° or 130°.

As shown in FIG. 2, each fan blade 40 defines a chord length C that extends between opposite leading edge 106 and trailing edge 108. Chord length C may vary over span S of fan blade 40. In some embodiments, chord length C may be longer or greater in a root region of span S, to enable a higher lift in the root region of fan 38. The higher lift may be desired to increase the fan pressure ratio in the root region and thereby maintain supercharging at the core, although the overall fan pressure ratio of fan 38 may be maintained below about 1.5 as described above.

Referring still to FIG. 2, a portion of span S adjacent root 102 may define a root span region $S_R$ and a portion of span S adjacent tip 104 may define a tip span region $S_T$. Root 102 may be designated a zero span location, i.e., span S begins at root 102 such that root 102 is at zero span or zero percent of span S. Tip 104 may be designated a full span location, i.e., span S ends at tip 104 such that tip 104 is at full span or one hundred percent (100%) of span S. Locations along fan blade 40 between root 102 and tip 104 may be designated as fractions or percentages of span S, e.g., the midpoint of fan blade 40 is at half span or fifty percent (50%) of span S. Accordingly, root span region $S_R$ may correspond to the portion of span S between zero span and a fraction or percentage of span S near root 102, and tip span region $S_T$ may correspond to the portion of span S between a fraction or percentage of span S near tip 104 and full span. As one example, root span region $S_R$ may extend from root 102 at zero span to about ten percent (10%) of span S, or as another example, root span region $S_R$ may extend from root 102 at zero span to about twenty percent (20%) of span S. Similarly, in some embodiments, tip span region $S_T$ may extend from about ninety percent (90%) of span S to tip 104 at full span or one hundred percent (100%) of span S, or in other embodiments, tip span region $S_T$ may extend from about eighty percent (80%) of span S to tip 104 at full span or one hundred percent (100%) of span S. Of course, root and tip span regions $S_R$, $S_T$ also may correspond to other portions of span S adjacent root 102 and tip 104, respectively.

As stated, fan 38 has a corresponding solidity, which is a conventional parameter equal to the ratio of the blade chord length C at a span location divided by the circumferential spacing B, or spacing from blade to blade, at the corresponding span location. Circumferential spacing B is equal to the circumferential distance around the fan at the specific radial span divided by the total number of fan blades in the blade row. Accordingly, the solidity is directly proportional to the number of blades and chord length and inversely proportional to the radial distance from longitudinal axis 12. To optimize the performance of variable pitch fan 38, the solidity of fan 38 preferably is at least 1.0 in root span region $S_R$. That is, the solidity of fan 38 is at least 1.0 adjacent fan blade root 102, e.g., along ten to twenty percent (10-20%) of blade span S or at each span location of root span region $S_R$.

Typical high solidity turbofans have adjacent fan blades 40 that substantially overlap each other circumferentially due to the high solidity and high angle of the blade chord with respect to the axial direction, or stagger, of the airfoils. For example, as shown in FIG. 2, fan blades 40 have high solidity and adjacent blades would contact each other when passing through the flat pitch position. Due to the solidity of fan blades 40, it can be seen that fan blades 40 would overlap at least in region 110 if they pass through flat pitch at the same time. However, given the configuration shown in FIG. 2, unacceptable blade contact will occur if fan blades 40 rotate in unison through flat pitch. Accordingly, the solidity of fan 38 may vary along span S of fan blades 40 to enable the variation of the pitch of fan blades 40 within the desired pitch range, e.g., a pitch range of about 80°, about 120°, or another desired pitch range. For example, the solidity of fan 38 may be less than 1.0 in the tip span region $S_T$ to allow fan blades 40 to pass through each other to reverse thrust. In such embodiments, where the solidity in the root span region $S_R$ is at least 1.0 and the solidity in the tip span region $S_T$ is less than 1.0, tips 104 of fan blades 40 may reverse fully but the roots 102 may not.

Alternatively or additionally, fan 38 may be configured for asynchronous blade pitching as described below with respect to FIGS. 3 through 6. Such a system, i.e., asynchronous blade pitching, can ensure that fan blades 40 do not pass through flat pitch at the same time, as well as provide other performance-related improvements to the operation of fan 38, as discussed below.

Figure 3:
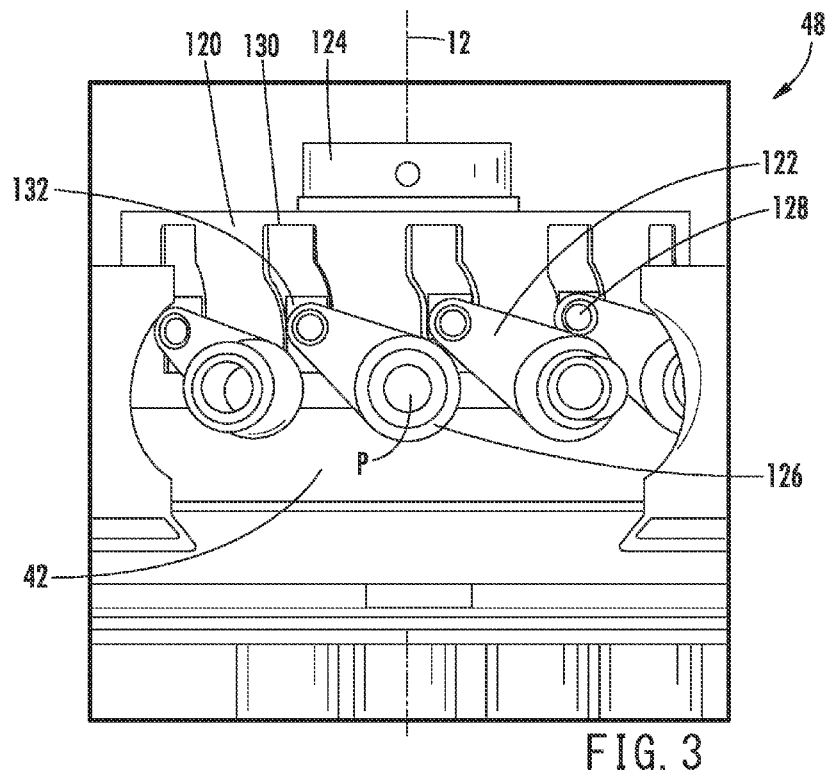
FIG. 3 is a schematic side view of an actuation assembly of the exemplary variable pitch fan of FIG. 2, where the fan blades are in a feathered position.
Figure 4:
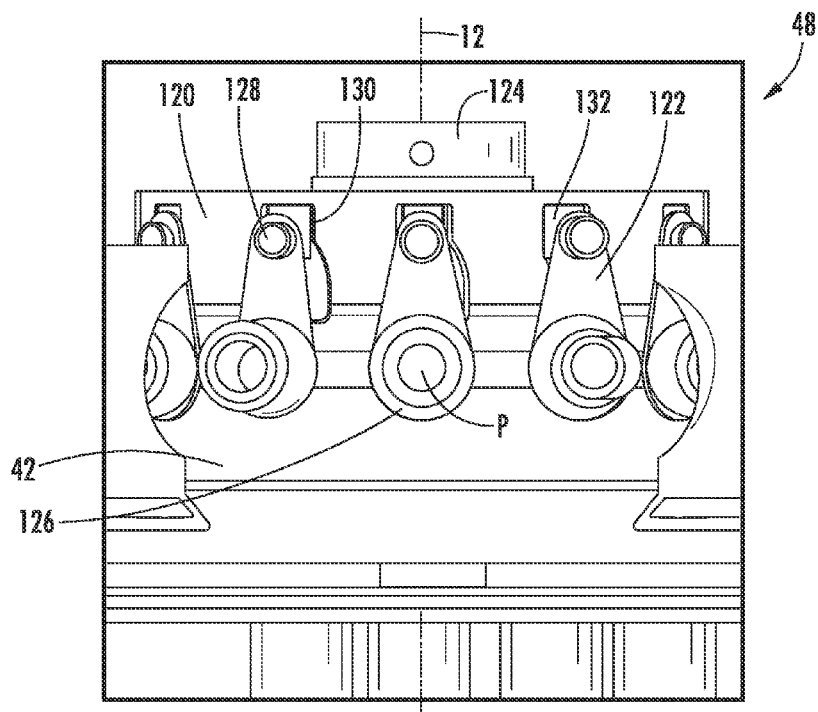
FIG. 4 is a schematic side view of an actuation assembly of the exemplary variable pitch fan of FIG. 2, where the fan blades are in a flat pitch position.

Referring now to FIGS. 3 and 4, a blade pitch change actuation assembly 48 in accordance with an exemplary embodiment of the present disclosure is depicted. As mentioned above, each fan blade 40 is rotatable relative to disk 42 about a pitch axis P. Fan blades 40, disk 42, and actuation assembly 48 are together rotatable about the longitudinal axis 12 by LP shaft 36 across a power gear box 50.

Pitch change actuation assembly 48 generally comprises a scheduling ring 120, plurality of linkage arms 122, and an electric motor 124. Each fan blade 40 may be rotatably coupled to disk 42 through a first end 126 of a corresponding linkage arm 122 such that the first end 126 and the corresponding fan blade 40 may rotate about pitch axis P relative to disk 42. In this regard, fan blade 40 may be fixedly connected to first end 126 of the corresponding linkage arm 122, such that rotation of linkage arm 122 causes fan blade 40 to rotate relative to disk 42.

A second end 128 of linkage arm 122 may be slidably connected to one of a plurality of slots 130 defined in scheduling ring 120. For example, second end 128 may be rotatably connected to a sliding member 132. Sliding member 132 may be slidably received in a slot 130 of the scheduling ring 120. Scheduling ring 120 is rotatable about longitudinal centerline 12 relative to disk 42 and is operatively coupled with electric motor 124, which is fixed relative to disk 42.

Each of the plurality of slots 130 on scheduling ring 120 defines a blade pitch schedule. In this regard, for a given angle of rotation of scheduling ring 120, the blade pitch schedule determines the actual pitch angle of the fan blades 40. In operation, electric motor 124 rotates scheduling ring 120 relative to disk 42. As scheduling ring 120 rotates, sliding member 132 moves along slot 130 and the angular position of linkage arm 122 changes. As each linkage arm 122 rotates, the corresponding fan blade 40 rotates as well, thus rotating each fan blade 40 about its pitch axis P. In alternative embodiments, one or more hydraulic actuators or any other suitable device or mechanism may be used in place of or in addition to electric motor 124 to rotate scheduling ring 120.

Therefore, by rotating scheduling ring 120 relative to disk 42, each of the plurality of fan blades 40 rotates about its respective pitch axis P according to a blade schedule defined by the slot 130 to which it is coupled by linkage arm 122. By defining different blade pitch schedules, the rotation of fan blades 40 may be controlled independently of each other. Thus, for example, if alternating fan blades 40 are rotated according to different blade pitch scheduling, conflict through, e.g., flat pitch may be avoided. In addition, the pitch schedule may be adjusted to improve performance of fan blade 40.

The blade pitch schedules may depend, for example, on whether the aircraft is in a coarse/feather phase, a normal flight phase, a flat pitch transition phase, a reverse thrust configuration, or other flight phases. For example, variable pitch fan 38 may be configured for normal flight phase when fan blades 40 have a pitch of greater than 8°. In addition, when fan blades 40 are within 8° of flat pitch (i.e., between −8° and 8°), variable pitch fan 38 may be operating in a flat pitch transition phase. The fan blades 40 may be in a reverse thrust phase when angled at −8° or less. One skilled in the art will appreciate that these ranges are used only for the purpose of explanation and that phases and blade schedules may be defined in a variety of other ways to improve performance of variable pitch fan 38 and engine 10. Further, as previously described, the overall pitch range, i.e., the range of variation in pitch for all flight phases, may be about 80° in some embodiments, about 120° in other embodiments, and about 130° in still other embodiments, although the pitch range may have other values as well.

In an example embodiment, the plurality of fan blades 40 rotate according to different pitch schedules to avoid conflict as fan blades 40 rotate through flat pitch. More specifically, as shown in FIG. 2, a first set of fan blades 134 may rotate according to a first blade pitch schedule, and an alternating, second set of fan blades 136 may rotate according to a second blade pitch schedule. The first and second blade pitch schedule may be the same for a first phase of rotation, which may correspond to normal flight operation, but the pitch schedules may deviate from one another as the fan blades 40 enter flat pitch. For example, as soon as the pitch of the plurality of fan blades 40 reach within 8° of flat pitch, the rotational speed of the first set of fan blades 134 may increase while the rotational speed of the second set of fan blades 136 may decrease. In this manner, the first set of blades 134 may pass through flat pitch sequentially ahead of the second set of blades 136, thus avoiding contact through flat pitch. After all fan blades 40 have passed through flat pitch and begin to generate reverse thrust, the first and second blade pitch schedules may once again sync up with each other so that all fan blades 40 rotate in unison. Alternatively, however, the blade schedules may remain offset to ensure reverse thrust is achieved without choking the air going to core 16 of engine 10 or to achieve other performance improvements.

One skilled in the art will appreciate that the blade pitch schedules discussed above are only exemplary, and that any other blade pitch schedule or schedules may be used as needed for performance. For example, more than two blade pitch schedules may be used. Indeed, every fan blade 40 could rotate according to its own pitch schedule. All such variations are contemplated as within the scope of the present disclosure.

Figure 5:
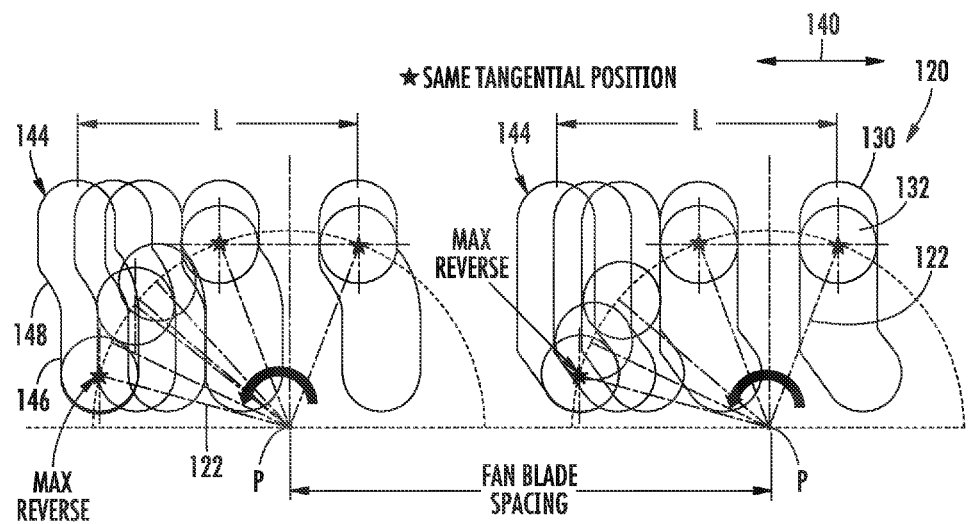
FIG. 5 is a diagrammatic view of the pitch scheduling ring showing the scheduling slot for two adjacent fan blades as the scheduling ring is rotated in accordance with embodiments of the present disclosure.
Figure 6:
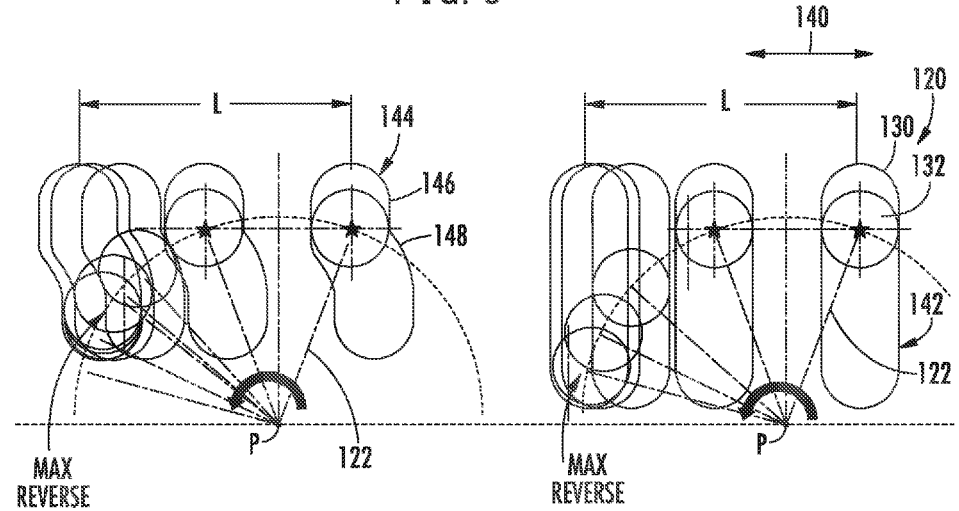
FIG. 6 a diagrammatic view of the pitch scheduling ring showing the scheduling slot for two adjacent fan blades as the scheduling ring is rotated in accordance with embodiments of the present disclosure.

Now referring to FIGS. 5 and 6, a schematic representation of the displacement of the sliding member 132 is shown. This representation depicts two adjacent fan blades 40 rotating according to blade schedules defined by scheduling slots 130 in scheduling ring 120. In the illustrated embodiment, each fan blade 40 is centered about its respective pitch axis P, where it is rotatably coupled to disk 42. Each linkage arm 122 is schematically represented by dotted line 122 and rotates a fixed radial distance about its respective pitch axis P. Sliding member 132 is rotatably connected to linkage arm 122 and is slidably coupled to scheduling slot 130.

As shown in the figures, as scheduling ring 120 rotates relative to disk 42, scheduling slots 130 generally are translated in the direction indicated by arrow 140. For each angular position of scheduling ring 120, the angular position of each fan blade 40 may be varied according to the shape of its respective scheduling slot 130. For example, referring specifically to FIG. 6, some scheduling slots 130 may be entirely linear (e.g., linear scheduling slot 142). By contrast, some scheduling slots 130 may be non-linear (e.g., non-linear scheduling slot 144), for example, by having one or more linear portions 146 and one or more bent portions 148. In other embodiments, scheduling slots 130 may be curved, serpentine, or any other suitable shape.

Notably, when scheduling ring 120 is rotated at a constant velocity, a linkage arm 122 connected to the entirely linear scheduling slot 142 will have a constant rotational speed function about pitch axis P. By contrast, the rotational speed of a linkage arm 122 connected to a non-linear slot will vary according to the shape of its respective scheduling slot 130. In this manner, by alternately shaping each scheduling slot 130, alternating fan blades 40 may rotate into flat pitch at different times, such that fan blade 40 contact will not occur through flat pitch. In addition, adjacent scheduling slots 130 may have a similar profile throughout the pitch range of fan blade 40, such that fan blades 40 rotate in unison throughout their range with the exception of the point where they enter flat pitch.

One skilled in the art will appreciate that the above-described mechanism for actuating the rotation of the fan blades is only one exemplary mechanism for achieving asynchronous fan blade pitching. Other mechanisms will be evident to a skilled artisan based on the present disclosure. Any such variations or modifications are contemplated as within the scope of the present disclosure. Further, in some embodiments, the desired pitch range of fan blades 40 may be achieved without requiring asynchronous fan blade pitching. For example, as described in more detail herein, the mechanism used to attach fan blades 40 to disk 42 may be configured such that a pitch range of at least about 80°, and more specifically at least about 120° or 130°, is possible. In such embodiments, other suitable pitch change actuation assemblies or mechanisms may be used to vary the pitch of fan blades 40.

The above-described embodiments facilitate enabling thrust reverse for a variable pitch fan 38 with the fan blade 40 solidity greater than one without a need for a heavy thrust reverse mechanism. Particularly, the proposed fan blade 40 pitch change mechanism enables 2-phase asynchronous fan blade 40 pitching, such that at least circumferentially adjacent fan blades 40 rotate on a different schedule through flat pitch and/or reverse, which allows fan blades 40 to pass each other without contact. For example, the pitch change mechanism or actuator assembly can rotate six out of twelve fan blades 40 on a different schedule through reverse, thus allowing reverse thrust to be achieved without contact between fan blades 40 as they pass through flat pitch. All fan blades 40 may rotate on the same schedule throughout the entire flight envelope with the exception of the reverse condition. Benefits of asynchronous fan blade 40 pitching include improvements in engine efficiency and specific fuel consumption. Installation is also simplified as compared to prior designs, fan operability is improved, and stall margin is increased. Other advantages will be apparent to those of skill in the art.

Figure 7:
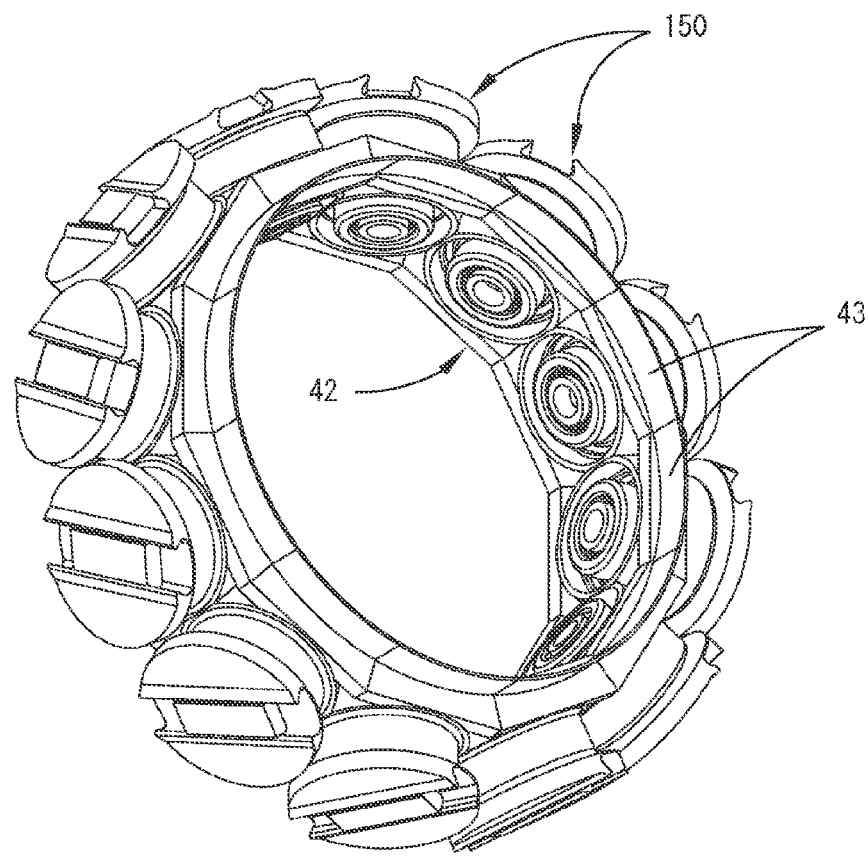
FIG. 7 is a perspective view of a disk and associated trunnion mechanisms of the exemplary variable pitch fan of FIG. 2.
Figure 8:
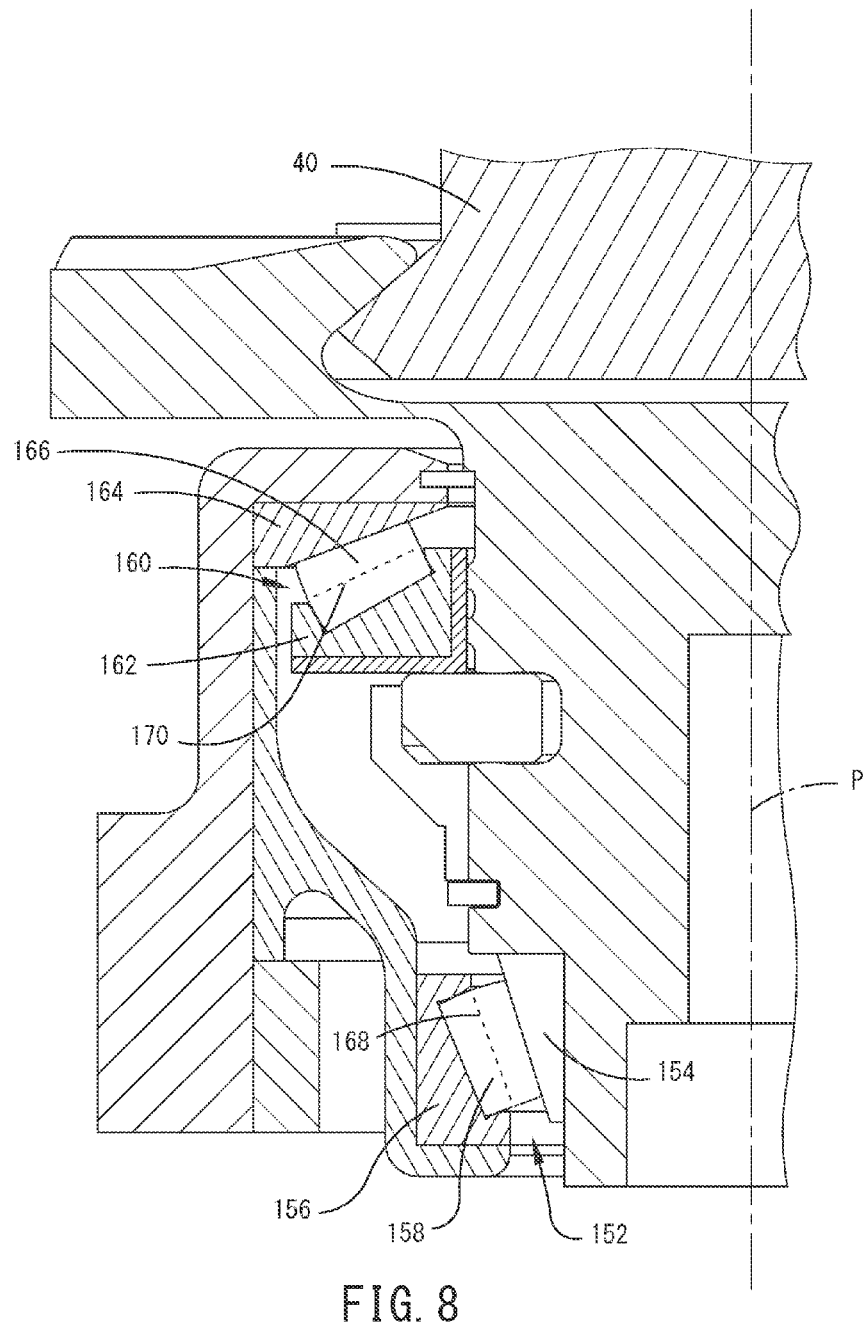
FIG. 8 is a partial cross-sectional view of a disk segment and trunnion mechanism of FIG. 7.

Referring now to FIGS. 7 and 8, an attachment mechanism enabling a pitch range of at least about 80°, and preferably about 120° or 130°, is shown. As shown in FIG. 7, disk 42 includes a plurality of disk segments 43 that are rigidly coupled together or integrally molded together in a generally annular shape (e.g., a polygonal shape). One fan blade 40 is coupled to each disk segment 43 at a trunnion mechanism 150 that facilitates retaining its associated fan blade 40 on disk 42 during rotation of disk 42 (i.e., trunnion mechanism 150 facilitates providing a load path to disk 42 for the centrifugal load generated by fan blades 40 during rotation about longitudinal centerline axis 12), while still rendering its associated fan blade 40 rotatable relative to disk 42 about pitch axis P. Notably, the size and configuration of each trunnion mechanism 150 directly influences the diameter of disk 42. On the one hand, larger trunnion mechanisms 150 tend to occupy larger circumferential segments of disk 42 and, hence, tend to result in a larger diameter of disk 42. On the other hand, smaller trunnion mechanisms 150 tend to occupy smaller circumferential segments of disk 42 and, hence, tend to result in a smaller diameter of disk 42.

Referring now to FIG. 8, a partial cross-section of an individual disk segment 43 and trunnion mechanism 150 in accordance with an exemplary embodiment of the present disclosure are depicted. In the illustrated embodiment, each trunnion mechanism 150 extends through its associated disk segment 43 and includes a first line contact bearing 152 having, e.g., an inner race 154, an outer race 156, and a plurality of rollers 158; and a second line contact bearing 160 having, e.g., an inner race 162, an outer race 164, and a plurality of rollers 166. For use as bearings 152, 160, at least the following types of line contacting type rolling element bearings are contemplated: cylindrical roller bearings; cylindrical roller thrust bearings; tapered roller bearings; spherical roller bearings; spherical roller thrust bearings; needle roller bearings; and tapered roller needle bearings. It should be appreciated, however, that in other exemplary embodiments, trunnion mechanism 150 may additionally or alternatively include any other suitable type of bearing. For example, in other exemplary embodiments, trunnion mechanism 150 may include roller ball bearings or any other suitable bearing.

In the depicted exemplary embodiment, first line contact bearing 152 is oriented at a different angle than second line contact bearing 160 (as measured from a centerline axis 168 of rollers 158 relative to pitch axis P, and from a centerline axis 170 of rollers 166 relative to pitch axis P). More specifically, line contact bearings 152, 160 are preloaded against one another in a face-to-face (or duplex) arrangement, wherein centerline axes 168, 170 are oriented substantially perpendicular to one another. It should be appreciated, however, that in other exemplary embodiments, line contact bearings 152, 160 may instead be arranged in tandem so as to be oriented substantially parallel to one another.

Notably, the farther away the bearings 152, 160 are from pitch axis P, the greater the number of rollers 158, 166 that can be included (due to the greater amount of room). With an increased number of rollers 158, 166, a centrifugal load on bearings 152, 160 may be distributed amongst more rollers 158, 166, reducing an amount of such load borne by each individual roller 158, 166. However, to facilitate making trunnion mechanism 150 more compact, it is desirable to locate its associated bearings 152, 160 closer to pitch axis P, thereby enabling more trunnion mechanisms 150 to be assembled on disk 42 and, hence, more fan blades 40 to be coupled to disk 42 for any given diameter of disk 42. For the depicted embodiment, the increased centrifugal loads borne by each individual roller 158, 166 due to the placement of bearings 152, 160 closer to pitch axis P (and, thus, a reduced number of rollers 158, 166) are accommodated by providing trunnion mechanism 150 with line contact bearings 152, 160, as opposed to angular point contact ball bearings. Thus, trunnion mechanism 150 is able to be made more compact because line contact bearings 152, 160 are better able to withstand larger centrifugal loads without fracturing or plastically deforming. More specifically, line contact bearings 152, 160 have larger contact surfaces and, therefore, can withstand larger centrifugal loads than, e.g., point contact ball bearings. Thus, line contact bearings 152, 160 can be spaced closer to pitch axis P than point contact ball bearings.

Further, for the depicted exemplary embodiment, an amount of centrifugal force generated by trunnion mechanisms 150 themselves (and, thus, an amount of centrifugal force that must be accommodated by trunnion mechanisms 150) is reduced by forming one or more components of first line contact bearing 152 and/or second line contact bearing 160 of a nonferrous material. Such a configuration may reduce a weight/mass of the respective bearings 152, 160 and of trunnion mechanism 150 as a whole.

For example, in certain exemplary embodiments of the present disclosure, one or both of first line contact bearing 152 and second line contact bearing 160 may include one or more components comprised of a ceramic material or a nickel titanium alloy material. More particularly, with reference to the first line contact bearing 152, one or more of rollers 158, inner race 154, or outer race 156 may be comprised of a nonferrous material, such as a ceramic material or a nickel titanium alloy material. Additionally, with reference to second line contact bearing 160, one or more of rollers 166, inner race 162, or outer race 164 may also be comprised of a nonferrous material, such as a ceramic material or a nickel titanium alloy material. As used herein, "ceramic material" refers to any type of ceramic material suitable for use in bearings, including, but not limited to, silicone nitride ($Si_3N_4$), zirconia oxide ($ZrO_2$), alumina oxide ($Al_2O_3$), and silicon carbide (SiC). Additionally, as used herein, "nickel titanium alloy material" refers to any metal alloys of nickel and titanium, sometimes referred to as nitinol, suitable for use in bearings.

By forming one or more of the components of first line contact bearing 152 and/or second line contact bearing 160 of a nonferrous material, such as a ceramic material or nickel titanium alloy material, trunnion mechanisms 150 may define a reduced overall weight. Thus, the centrifugal forces on trunnion mechanisms 150 generated by trunnion mechanisms 150 themselves (i.e., a "dead load") during rotation of fan 38 about the longitudinal centerline 12 may be reduced (as such trunnion mechanisms 150 are not having to support the additional weight during operation). For example, in certain exemplary embodiments, forming one or more of the components of first line contact bearing 152 and/or second line contact bearing 160 of a nonferrous material can reduce a dead load on trunnion mechanisms 150 during rotation of fan 38 by as much as ten percent (10%) or fifteen percent (15%). Accordingly, the overall size of trunnion mechanisms 150 may be reduced even further. More particularly, such a configuration may allow bearings 152, 160 to be positioned even closer to pitch axis P (as fewer rollers are required), further reducing the size of trunnion mechanisms 150. Thus, such bearings are, e.g., better able to withstand increased centrifugal loads associated with higher blade counts and/or able to be reduced in size to accommodate a reduction in the hub to fan radius ratio.

Additionally, or alternatively, in certain exemplary embodiments, one or more of the components of first line contact bearing 152 and/or second line contact bearing 160, such as one or more of rollers 158, 166, inner races 154, 162, or outer races 156, 164 of first and second line contact bearings 152, 160, respectively, may be comprised of material having a relatively low Young's modulus, such as a Young's modulus less than or equal to about 25 Mpsi. For example, in certain exemplary embodiments, one or more of the above components of first and/or second line contact bearings 152, 160 may be comprised of material having a Young's modulus less than or equal to about 20 Mpsi, less than or equal to about 17 Mpsi, less than or equal to about 15 Mpsi, or less than or equal to about 14 Mpsi. Such an exemplary embodiment may allow the respective components to withstand an increased amount of force, such as an increased amount of centrifugal force, as such components may elastically deform during rotation of fan 38. For example, when a component undergoes an elastic deformation, an increased contact surface area may be defined between the component and an adjacent component. For example, in certain embodiments wherein rollers 158 of first line contact bearing 152 are comprised of a material having a relatively low Young's modulus, rollers 158 may at least partially elastically deform during operation, such that an increased contact surface area is defined between, e.g., rollers 158 and inner race 154 and/or outer race 156, allowing for a greater distribution of force between the components.

By contrast, however, in other exemplary embodiments, one or more of the components of first line contact bearing and/or second line contact bearing 152, 160 may instead be comprised of material having a relatively high Young's modulus, such as a Young's modulus greater than or equal to about 35 Mpsi, greater than or equal to about 40 Mpsi, or greater than or equal to about 45 Mpsi. Such a configuration may allow for, e.g., bearings 152, 160 having an increased stiffness and, thus, may allow for more accurate and precise operation of the respective bearings.

The above-described embodiments facilitate providing a gas turbine engine with a smaller variable pitch fan that can generate larger amounts of thrust. Particularly, the above-described embodiments facilitate providing a gas turbine engine with a variable pitch fan having, e.g., a larger pitch range, a higher blade count, a lower/shorter blade length, a lower hub to fan radius ratio, a lower fan pressure ratio, and/or an increased solidity in a root region of the blades. Such can increase the fan's efficiency, which, e.g., can decrease the fuel burn during operation and can otherwise improve the engine's performance.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A variable pitch fan for a propulsion device, the variable pitch fan comprising:
  a plurality of fan blades coupled to a disk, each fan blade of the plurality of fan blades extending radially outward from the disk, each fan blade extending along a span from a root to a tip, a portion of the span adjacent the root defining a root span region, a portion of the span adjacent the tip defining a tip span region, each fan blade rotatable about a pitch axis to vary a pitch of the fan blade; and
  a pitch change actuation assembly for varying the pitch of the plurality of fan blades, the actuation assembly comprising:
    a scheduling ring rotatable relative to the disk and defining a plurality of slots,
    a plurality of linkage arms, and
    a plurality of sliding members, wherein each linkage arm is coupled to one fan blade of the plurality of fan blades, each sliding member is rotatably connected to one linkage arm of the plurality of linkage arms, and each sliding member is slidably coupled to one slot of the plurality of slots to operatively couple the fan blades to the slots, wherein the plurality of slots includes at least one linear slot and at least one non-linear slot, wherein each of the plurality of fan blades rotates according to a blade pitch schedule defined by the slot to which it is operatively coupled, wherein at least two of the plurality of slots define different blade pitch schedules, wherein the pitch axis of each of the plurality of fan blades extends radially through the fan blade, the pitch variable within a pitch range, the pitch range being at least 80°, wherein a solidity of the variable pitch fan is at least 1.0 in the root span region of each blade, and wherein the solidity of the variable pitch fan is less than 1.0 in the tip span region of each blade.

2. The variable pitch fan of claim 1, further comprising a rotatable front hub covering the disk, wherein a fan hub radius ratio of the variable pitch fan is less than about 0.40.

3. The variable pitch fan of claim 1, wherein the plurality of fan blades comprises at least ten fan blades.

4. The variable pitch fan of claim 1, wherein the pitch range of each of the plurality of fan blades corresponds to the variation in pitch between a feather pitch position and a reverse pitch position.

5. The variable pitch fan of claim 1, wherein the pitch range of each of the plurality of fan blades corresponds to the variation in pitch between a flat pitch position and a reverse pitch position.

6. The variable pitch fan of claim 1, wherein the pitch range of each of the plurality of fan blades is about 120°.

7. The variable pitch fan of claim 1, further comprising a plurality of trunnion mechanisms for coupling each of the plurality of fan blades to the disk, each trunnion mechanism including a bearing having one or more components comprised of a nonferrous material.

8. The variable pitch fan of claim 1, wherein the propulsion device is a gas turbine engine.

9. A variable pitch fan for a propulsion device, the variable pitch fan comprising:
a plurality of fan blades coupled to a disk, each fan blade of the plurality of fan blades extending radially outward from the disk, each fan blade extending along a span from a root to a tip, a portion of the span adjacent the root defining a root span region, a portion of the span adjacent the tip defining a tip span region, each fan blade rotatable about a pitch axis to vary a pitch of the fan blade;
a pitch change actuation assembly for varying the pitch of the plurality of fan blades, the actuation assembly comprising:
a scheduling ring rotatable relative to the disk and defining a plurality of slots,
a plurality of linkage arms,
a plurality of sliding members, and
an electric motor; and
a rotatable front hub covering the disk,
wherein each linkage arm is coupled to one fan blade of the plurality of fan blades, each sliding member is rotatably connected to one linkage arm of the plurality of linkage arms, and each sliding member is slidably coupled to one slot of the plurality of slots to operatively couple the fan blades to the slots, wherein the plurality of slots includes at least one linear slot and at least one non-linear slot, wherein the electric motor is operatively coupled to the scheduling ring to rotate the scheduling ring relative to the disk, wherein each of the plurality of fan blades rotates according to a blade pitch schedule defined by the slot to which it is operatively coupled, wherein at least two of the plurality of slots define different blade pitch schedules, wherein a solidity of the variable pitch fan is at least 1.0 in the root span region of each blade, wherein the solidity of the variable pitch fan is less than 1.0 in the tip span region of each blade, wherein a fan hub radius ratio of the variable pitch fan is less than about 0.40, and wherein the pitch axis of each of the plurality of fan blades extends radially through the fan blade, the pitch variable within a pitch range, the pitch range being at least 80°.

10. The variable pitch fan of claim 9, wherein the plurality of fan blades comprises at least ten fan blades.

11. The variable pitch fan of claim 9, wherein the propulsion device is a gas turbine engine.

12. The variable pitch fan of claim 9, further comprising a plurality of trunnion mechanisms for coupling each of the plurality of fan blades to the disk, each trunnion mechanism including a bearing having one or more components comprised of a non-ferrous material.

13. The variable pitch fan of claim 9, wherein the pitch range of each of the plurality of fan blades is about 120°.

14. The variable pitch fan of claim 9, wherein the pitch range of each of the plurality of fan blades corresponds to the variation in pitch between a feather pitch position and a reverse pitch position.

15. The variable pitch fan of claim 9, wherein the pitch range of each of the plurality of fan blades corresponds to the variation in pitch between a flat pitch position and a reverse pitch position.

16. The variable pitch fan of claim 1, wherein the pitch change actuation assembly further comprises an electric motor, and wherein the electric motor is operatively coupled to the scheduling ring to rotate the scheduling ring relative to the disk.

17. The variable pitch fan of claim 1, wherein the different blade pitch schedules include a first blade pitch schedule and a second blade pitch schedule, wherein the first blade pitch schedule is configured to increase a rotational speed of a first set of fan blades when the pitch of the plurality of fan blades reaches a pitch position within a first pitch range, and wherein the second blade pitch schedule is configured to decrease a rotational speed of a second set of fan blades when the pitch of the plurality of fan blades reaches the pitch position within the first pitch range.

18. The variable pitch fan of claim 1, wherein the at least one non-linear slot includes a linear portion and a bent portion.

19. The variable pitch fan of claim 9, wherein the at least one non-linear slot includes a linear portion and a bent portion.

* * * * *